(12) United States Patent
Stanich et al.

(10) Patent No.: US 7,446,904 B2
(45) Date of Patent: Nov. 4, 2008

(54) METHODS AND APPARATUS FOR GENERATING DITHER MASK THROUGH INTERPOLATION BETWEEN PREFERRED PATTERNS

(75) Inventors: Mikel John Stanich, Longmont, CO (US); Gerhard Robert Thompson, Wappingers Falls, NY (US); Charles P. Tresser, Brooklyn, NY (US); Chai Wah Wu, Poughquag, NY (US)

(73) Assignee: Infoprint Solutions Company, LLC, Boulder, CO (US)

( * ) Notice: Subject to any disclaimer, the term of this patent is extended or adjusted under 35 U.S.C. 154(b) by 755 days.

(21) Appl. No.: 10/856,470

(22) Filed: May 28, 2004

(65) Prior Publication Data
US 2005/0275900 A1  Dec. 15, 2005

(51) Int. Cl.
*H04N 1/405* (2006.01)
(52) U.S. Cl. .................. 358/3.13; 358/3.14; 382/237
(58) Field of Classification Search ........ 358/3.13–320, 358/1.9, 3.06; 382/237
See application file for complete search history.

(56) References Cited

U.S. PATENT DOCUMENTS

| | | | |
|---|---|---|---|
| 5,111,310 A | 5/1992 | Parker et al. | |
| 5,557,709 A | 9/1996 | Shu | |
| 5,917,951 A * | 6/1999 | Thompson et al. | 382/237 |
| 6,025,930 A * | 2/2000 | Thompson et al. | 358/1.9 |
| 6,088,123 A | 7/2000 | Adler et al. | |
| 6,597,813 B1 | 7/2003 | Stanich et al. | |
| 7,119,928 B2 * | 10/2006 | Harrington | 358/3.2 |
| 2004/0233477 A1 * | 11/2004 | Stanich et al. | 358/3.14 |

FOREIGN PATENT DOCUMENTS

| | | |
|---|---|---|
| EP | 0 843 462 A | 5/1998 |
| EP | 1 241 865 A | 9/2002 |
| WO | 2005/016184 | 8/2005 |

OTHER PUBLICATIONS

C.W. Wu et al., "Supercell Dither Masks with Constrained Blue Noise Interpolation," NIP17: International Conference on Digital Printing Technologies, Fort Lauderdale, Florida, pp. 487-490, 2001.
R.A. Ulichney, "Dithering with Blue Noise," Proceedings of the IEEE, vol. 76, No. 1, pp. 56-79, Jan. 1998.
M. Yao et al., "Modified Approach to the Construction of Blue Noise Mask," Journal of Electronic Imaging, vol. 3, No. 1, pp. 92-97, Jan. 1994.
R. Ulichney, "The Void-and-Cluster Method for Dither Array Generation," Proc. SPIE vol. 1913, pp. 332-343, 1993.

* cited by examiner

*Primary Examiner*—Thomas D Lee
*Assistant Examiner*—Stephen M Brinich
(74) *Attorney, Agent, or Firm*—Blakely Sokoloff Taylor & Zafman, LLP

(57) ABSTRACT

Techniques for generating dither masks are provided. A dither mask is generated by selecting a sequence of at least three original patterns comprising pixels of at least one of a first color and a second color. At least two patterns are interpolated to generate interpolated patterns in the sequence between the at least three original patterns. If a pattern having at least one specified characteristic exists in the sequence, the steps of interpolating between at least two patterns, and determining if a pattern having at least one specified characteristic exists in the sequence, are repeated. The interpolation is between at least one pattern from each side of the pattern having at least one specified characteristic in the sequence.

30 Claims, 4 Drawing Sheets

METHODS AND APPARATUS FOR GENERATING DITHER MASK THROUGH INTERPOLATION BETWEEN PREFERRED PATTERNS

FIELD OF THE INVENTION

The present invention relates to dither mask generation techniques and, more particularly, to methods and apparatus for halftoning which involve generating a dither mask through iterative interpolation.

BACKGROUND OF THE INVENTION

Digital halftoning is a technique for displaying a picture on a two-dimensional medium, in which small dots and a limited number of colors are used. The picture appears to consist of many colors when viewed from a proper distance. For example, a picture consisting of black and white dots can appear to display various grey levels.

Digital printers, which were initially purely black and white machines with a very coarse resolution, have evolved to accommodate colors, finer resolutions, and more recently, more than one bit of information per pixel. A pixel, as described herein, may refer to a pixel or a pel.

The fastest and most commonly used methods for digital halftoning involve dithering algorithms, which use threshold arrays, and are also referred to as dither matrices or dither masks. A dither mask, defined either in hardware or in software, can be thought of as a matrix of numbers. The original forms of these masks used periodic patterns of threshold values, referred to as an "ordered dither." In a "random dither," threshold values are taken according to some stochastic process. Conventional dither masks did not provide many grey levels. This was especially true in the case of clustered masks, where darker greys were produced by printing larger clusters of black dots, as opposed to the spreading techniques used in accordance with dispersed masks. Both types of masks are important in digital printing, with clustered masks usually utilized with laser printers, and dispersed masks usually utilized with ink jet printers.

A mask is defined as periodic if the size of the mask is approximately the minimum size required for a given number of distinct grey levels to be rendered, or if the arrangement of threshold values within the mask purposely forms periodic structures. Aperiodic usually refers to a "long period," which means that each of the threshold values is repeated a relatively large number of times in the mask in a manner in which the resulting mask is not simply a juxtapositioning of smaller identical masks.

Too much randomness in the design of a dither mask blurs the image and yields unaesthetic results. In the late 1980's, it was discovered that blue noise, or noise with the low frequencies attenuated in the radially averaged power spectrum for the vast majority of grey levels, provides improved visual effects, see, e.g., R. Ulichney, "Dithering with Blue Noise," Proc. IEEE 76, No. 1, 1988, pp. 56-79. Methods to construct dither masks with blue noise were subsequently proposed, see, e.g., U.S. Pat. No. 5,111,310 to Parker et al.; M. Yao et al., "Modified Approach to the Construction of a Blue Noise Mask," J. of Electronic Imaging 3, No. 1, 1994, pp. 92-97; and R. Ulichney, "The Void-and-Cluster Method for Dither Array Generation," Proc. SPIE 1913, 1993, pp. 332-343.

Blue noise masks generate dispersed dots, which means that black dots can only cluster if the grey level is dark enough to make it improbable or impossible to have all black dots isolated. As a consequence, blue noise masks are not practical for laser printers or xerographic printers.

To achieve clustering, a traditional threshold array may be constructed so that increasing the grey level corresponds to printing larger clusters at a fixed periodicity. While this method does not produce unpleasant artifacts, either the number of grey levels that may be represented using such a method is too small, or the clusters which are generated are too big. To correct these effects, a multicell array may be used, which is tiled by several single-cluster threshold arrays. In a multicell array, several clusters are grown with the same spatial period as in the single-cluster array, but they are not grown simultaneously. This allows for additional intermediate grey levels. Traditional multicell arrays are considered periodic and the order and manner in which the cells are grown commonly generates unpleasant periodic patterns at several grey levels.

Two important problems in dither mask generation are the production of clustered aperiodic masks and multicell masks with no artifacts. Typically, a multicell clustered dither array, when tested on all possible levels of uniform greys, will generate both good and less acceptable patterns, depending on the uniform grey level to be rendered and the physical characteristics of the printer.

These problems were addressed successively in:

1) U.S. Pat. No. 5,917,951 to Thompson et al. (hereafter referred to as "TTW1");
2) U.S. Pat. No. 6,025,930 to Thompson et al. (hereafter referred to as "TTW2");
3) U.S. Pat. No. 6,597,813 to Stanich et al. (hereafter referred to as "STTW"); and
4) C. W. Wu et al., "Supercell dither masks with constrained blue noise interpolation," NIP 17: IS&T's International Conference on Digital printing Technologies, 2001, pp. 487-490.

Each patent and paper is incorporated herein by reference. In solving these problems, it was common to provide techniques which combine the advantages of blue noise and clustering, in order to produce an acceptable pattern of halftoning as needed, for instance, in laser or xerographic printers.

More specifically, according to TTW1, TTW2, and STTW, methods of halftoning of grey scale images utilize a pixel-by-pixel comparison of the image against a clustered aperiodic mask comprised of a partly random and partly deterministic single valued function, which is designed to produce visually pleasing dot configurations when thresholded at any level of grey. The basic improvement of TTW2 over TTW1 was to provide more blueish effects. The basic improvement of STTW over TTW1 and TTW2 was the modulation of the clustering when constructing the mask from lightest to darkest grey levels. Thus, nonrandom dither masks are constructed, which present a similar lack of periodicity which makes blue noise pleasant to the eye. However, TTW1, TTW2, and STTW, which provide flexibility and adaptability to aesthetic criteria in the clustered case, fail to provide similar advantages in the dispersed case. More specifically, they fail to provide flexibility in maintaining desired characteristics of undesirable patterns in the dither mask.

SUMMARY OF THE INVENTION

The present invention provides techniques for generating and utilizing a dither mask and, more particularly, for generating a dither mask through iterative interpolation of a set of preferred patterns of two or more different colored (e.g., black and white) pixels, so that undesirable patterns may be removed from the sequence while their characteristics are maintained in the mask.

For example, in one aspect of the invention, a dither mask is generated by selecting a sequence of at least three original patterns comprising pixels of at least one of a first color and a second color. At least two patterns are interpolated to generate interpolated patterns in the sequence between the at least three original patterns. If a pattern having at least one specified characteristic exists in the sequence, the steps of interpolating between at least two patterns, and determining if a pattern having at least one specified characteristic exists in the sequence, are repeated. The interpolation is between at least one pattern from each side of the pattern having at least one specified characteristic in the sequence.

In an additional embodiment of the present invention, an image is halftoned by generating the dither mask and comparing each pixel of the image to a threshold value in the dither mask. A dot of a first color is printed for one or more pixels based on the comparison to the dither mask.

Advantageously, certain properties of an initial sequence of patterns may be forced into the final dither mask without having to explicitly design the mask generation apparatus for these cases. Completely different mask characteristics may be achieved using this invention, which otherwise would require specialized algorithms and methods.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
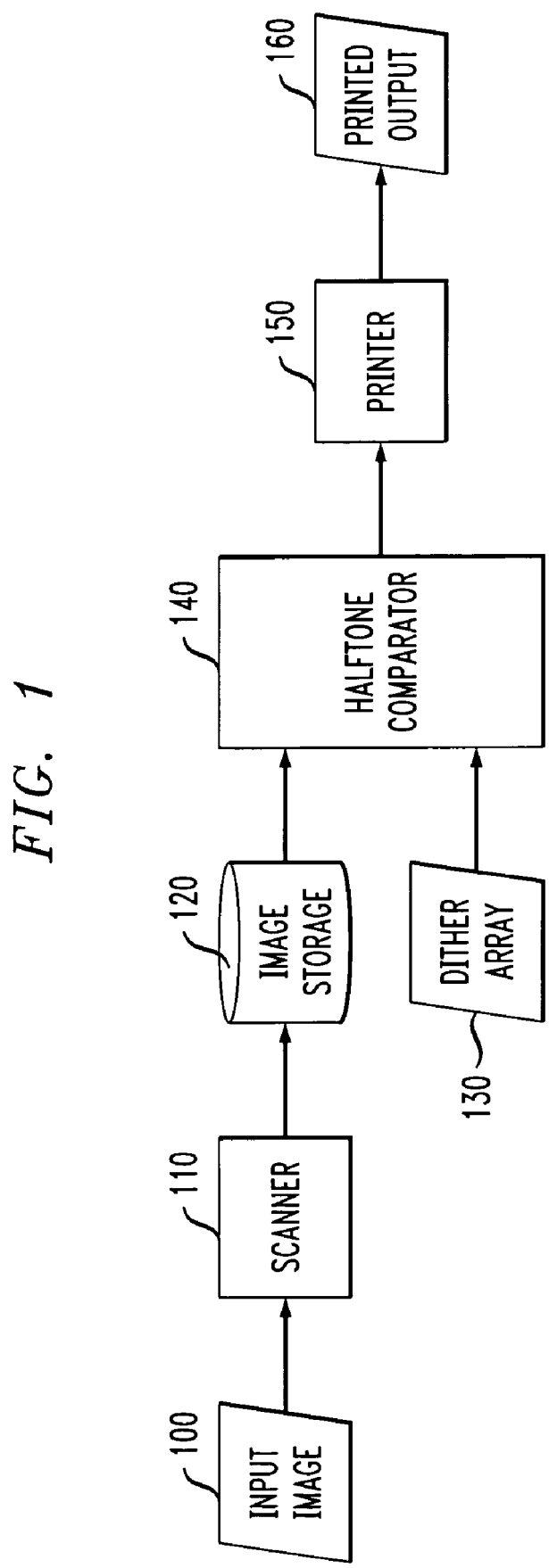
FIG. 1 is a block diagram illustrating a halftoning system, according to an embodiment of the present invention.

The following description will illustrate the invention using an exemplary data processing system architecture. It should be understood, however, that the invention is not limited to use with any particular system architecture. The invention is instead more generally applicable to any system in which it is desirable to generate a dither mask for halftoning techniques.

As will be illustrated in detail below, the present invention introduces techniques for generating a dither mask and, more particularly, for generating a dither mask through iterative interpolation of a set of preferred patterns of two or more colored (e.g., black and white) pixels, so that undesirable patterns may be removed from the sequence while their characteristics are maintained in the dither mask.

Those skilled in the art are aware that the improvements to printer models having one bit of information per pixel, may easily be applied to more advanced machines. Similarly, methods to generate and use a single dither mask may be adapted to generate and use several dither masks simultaneously. Although the dither mask generation techniques described below utilize a setting of black and white printing, with one bit of information per pixel, the techniques are extendible to color and multi-bit printers or other imaging devices.

As will be discussed herein, a mask is defined as an array, $M=[m(i,j)]$, of threshold values, where $i=1, 2, \ldots, h$, and $j=1, 2, \ldots, v$; with h and v being the horizontal and vertical sizes of the mask, respectively. It is assumed that $m(i,j)$ takes on N possible values, usually adjusted as $1, 2, \ldots, N$, and resulting in $N'=N+1$ distinct grey levels.

An input image, scaled to be at the resolution (usually expressed as dots per inch (dpi)) of the printer, is an array, $A=[a(i,j)]$, of input values, where $i=1, 2, \ldots, H$, and $j=1, 2, \ldots, V$; with H and V being the horizontal and vertical sizes of the image, respectively. In some embodiments $H>>h$ and $V>>v$, but these relationships are not required for all embodiments of the present invention.

An output image (a black and white image herein), at the printer resolution, is an array, $O=[o(i,j)]$, of output values, where $i=1, 2, \ldots, H$, and $j=1, 2, \ldots, V$; with H and V being the horizontal and vertical sizes of the image, respectively. The number of pixels per line H and the number of pixels per column V are the same for arrays A and O.

Given M and A, the output image O is defined by the following mask equation:

$$o(i,j)=S(a(i,j)-m(i \bmod h, j \bmod v)),$$

where $S(x)$ is the step function defined by $S(x)=0$ if $x<0$, and $S(x)=1$ if $x\geq0$. For the step function, a "1" corresponds to darkening a pixel, while a "0" corresponds to not darkening a pixel.

If $o(i,j)=1$ for some grey level g at $a(i,j)$, then $o(i',j')=1$ as well for any darker grey level g' at $a(i',j')$, where i mod h=i' mod h, and j mod v=j' mod v. This constraint is defined as the extension property, which is a direct consequence of the mask equation and is one of the main obstacles in generating visually pleasing masks. To illustrate this difficulty, notice that given two uniform grey levels, $g_1<g_2$, all pixels that are black for $g_1$ must be black for $g_2$.

From the geometric point of view, the h×v dither mask M will be implemented by assuming periodic boundary conditions so that the array can be thought of as being a two dimensional torus. Whenever the distance between two points in the array is referred to, or a related concept is used, it is meant to define the distance on the torus and not on the rectangle. The symbol M is used to designate the array given in the form of a matrix, the corresponding h×v rectangle, or the torus, and it should be clear whether the matrix, rectangle or torus is refered to.

With R representing the set of real numbers, and $R^2$ representing the plane parameterized by two coordinates which are real numbers; some function r: $R^2 \rightarrow R$ is chosen having a maximum number at the origin with decreasing numbers moving away from the origin, or having a minimum number at the origin with increasing numbers moving away from the origin. The function r is to be interpreted as a potential function. Better results are obtained by choosing a potential r which depends on the grey level $g_i$ one works with, and also the stage the dither mask generation methodology is in.

To initialize, or reinitialize the methodology of generating a mask, an initial sequence of patterns $P_k$ is chosen, which is visually pleasing. A pattern is an h×v matrix of "0's" and "1's". The "0's" correspond to white pixels and the "1's" correspond to black pixels. Each pattern $P_i$ corresponds to a grey level $g_i$ ($0 \leq g_i \leq 1$) which is the proportion of black pixels to total pixels in $P_i$. The number of patterns in this initial sequence is less than the final number of grey levels, and contains at least two patterns: all "0's" and all "1's." This initial sequence must satisfy the extension property, such that for any two patterns $P_i$ and $P_{i+1}$, any pixel which is black in $P_i$ is also black in $P_{i+1}$. This initial condition can be expressed with k starting patterns with grey levels $g(P^0_1)<g(P^0_2)< \ldots <g(P^0_k)$.

Thus, a full set of threshold values are generated for all grey levels 1, 2, . . . , N' according to the patents and paper incorporated herein by reference. $N_1$ visually pleasing grey levels $g(P^1_1)<g(P^1_2)< \ldots <g(P^1_{N1})$ are chosen that satisfy the extension property by construction. These grey levels may, but are not required to, contain the initial condition $g(P^0_1)<g(P^0_2)< \ldots <g(P^0_k)$. For instance, abandoning the initial condition provides patterns that are visually pleasing and appear to avoid periodicity, but in fact are periodic if the starting patterns $g(P^0_1)<g(P^0_2)< \ldots <g(P^0_k)$ were periodic.

The new patterns $g(P^1_1)<g(P^1_2)< \ldots <g(P^1_{N1})$ may then be used as the initial condition for the next stage. The described methodology has been devised such that it can naturally be iterated, producing successive stages and a new initial condition, for example $g(P^m_1)<g(P^m_2)< \ldots <g(P^m_{Nm})$.

The methodology terminates when one has approximately N' pleasing grey levels, i.e., $N_m$ is approximately equal to N'. The approximation is acceptable since some grey levels are without much visual impact. For example, missing levels may be isolated, very light or very dark.

The methodology for generating a full mask can first concentrate on generating only special grey levels that will be used as an initial condition for one or several grey levels. To this end, instead of producing all N' grey levels, only consecutive grey levels in the neighborhood of a grey level are produced where selected greys are used as initial conditions.

For example, the power and versatility of this method is illustrated with the halftone pattern corresponding to a grey level of ½ (threshold levels below N/2) forming a checkerboard, together with a lighter and a darker pattern. Neighboring greys levels are then generated that are not periodic, and two are selected, one lighter than ½, one darker than ½. The selected grey levels may be modified for aesthetics, and then may be further modified to satisfy the extension property. Then these two levels are used to generate a grey level ½, the methodology being iterated until a ½ grey is produced that may be slightly aperiodic and visually pleasing.

Referring now to the drawings, and more particularly to FIG. 1, a block diagram illustrates a halftoning system, according to an embodiment of the present invention. More specifically, an input image 100 is scanned by a scanner 110 and stored in image storage 120 as image array A=a(i,j) where (i,j) is the pixel location in image array A. Input image 100 may be input into the system by other methods and apparatus as well. A dither matrix array M=m(i,j) 130 is used to halftone the image in image storage 120.

If N'=N+1 is the number of grey levels to be represented, any h×v matrix M=m(i,j) considered in this description is an array of numbers between 0 and N, representing threshold levels. Dither mask generation works according to the mask equation:

$$o(i,j)=S(a(i,j)-m(i \bmod h, j \bmod v)),$$

generating the output image O=o(i,j) at halftone comparator 140. This array can then be transformed to an actual printed image 170 at printer 160. The actual printing of the image may begin before M is fully composed. The printer may be external to the processor where the composition of O out of A and M takes place, and all information transfer between parts such as scanner, processor, and printer may be wired or wireless.

Figure 2:
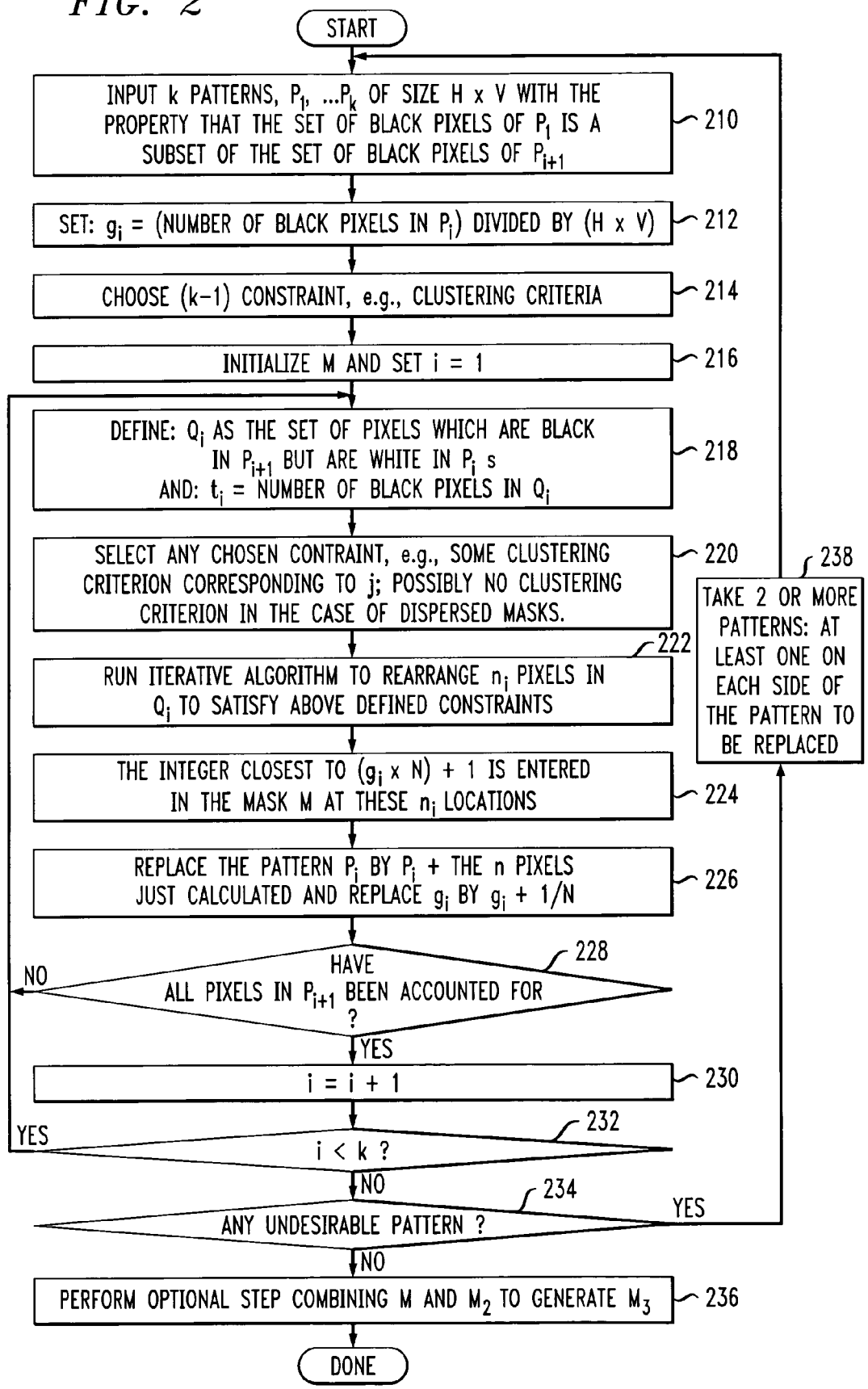
FIG. 2 is a flow diagram illustrating a dither mask generation methodology for the system of FIG. 1, according to an embodiment of the present invention.

Referring now to FIG. 2, a flowchart illustrates an exemplary methodology for generating a dither mask M, for use in the halftoning system shown in FIG. 1, according to an embodiment of the present invention.

The methodology begins at block 210, where an ordered sequence of k patterns $P_1, \ldots, P_k$, of black and white pixels are chosen. Each pattern has a size h×v, where h and v are positive integers. For each pattern $P_i$, the corresponding grey level $g_i$ ($0 \leq g_i \leq 1$) is defined as $g_i$=(number of black pixels in $P_i$)/(h×v), as determined in block 212. $P_1$ is chosen as the zero matrix, having all white pixels and a matrix of all "0's." This choice is preferable for completeness but is not necessary since very light greys are also easy to incorporate into embodiments of the present invention. The corresponding grey level $g_1$ is equal to 0. $P_k$ is chosen as the pattern of all black pixels, having a matrix of all "1's." Again, this choice is preferable for completeness but is not necessary since very dark greys are easily incorporated into the embodiments of the present invention. The corresponding grey level is $g_k$=1.

In block 214, a set of constraints is chosen. An example of a constraint may include clustering criteria (see patents and paper incorporated herein by reference). Choosing no constraint may also be considered a type of constraint. There may be one constraint for each set of patterns $P_i$ and $P_{i+1}$, where i ranges from 1 to k−1.

A dither mask M is initialized in block 216 as follows:
1) For each black pixel in $P_1$, the corresponding entry in M is set to $g_1 \times N$, rounded to an integer, where N is the number of values assumed by m(i,j);
2) For each black pixel in $P_2$ which is not in $P_1$, the corresponding entry in M is set to $g_2 \times N$, rounded to an integer; and
3) For each back pixel in $P_i$ which is not in $P_1, \ldots, P_{i-1}$, the corresponding entry in M is set to $g_i \times N$, rounded to an integer.

For each pair of adjacent patterns $P_i$ and $P_{i+1}$, the mask is filled with threshold values to generate the halftones for the grey levels between $g_i$ and $g_{i+1}$.

In block 218, starting with i=1, $Q_i$ is defined as the set of pixels that are black in $P_{i+1}$ but not in $P_i$. The number of black pixels in $Q_i$ is denoted as $t_i$. An integer $n_i$ approximately equal to $t_i/(N \times (g_{i+1}-g_i))$ is then computed, and the constraint is selected at block 220 for the pair of adjacent patterns.

Figure 3:
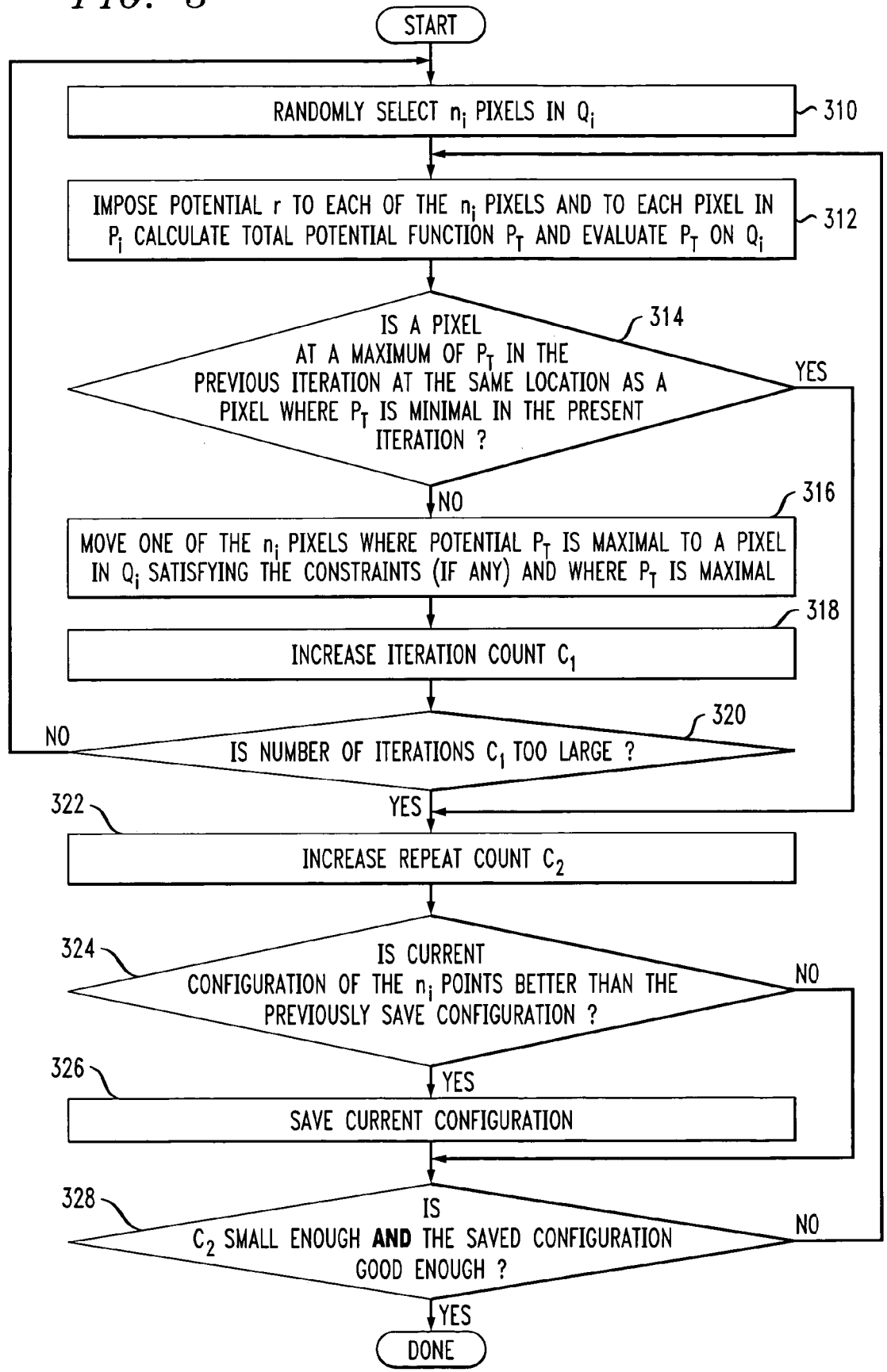
FIG. 3 is a flow diagram illustrating an iterative pixel arrangement methodology, according to an embodiment of the present invention.

Next, as further described in FIG. 3, an iterative scheme is used in block 222 to rearrange $n_i$ pixels in $Q_i$ such that:
1. These $n_i$ pixels remain within $Q_i$;
2. These $n_i$ pixels, along with $P_i$, form a sufficiently aperiodic pattern; and
3. These $n_i$ pixels, along with $P_i$ satisfy the selected constraint.

The integer closest to $(g_i \times N)+1$ is entered in the dither mask at these $n_i$ locations at block 224. This guarantees that $P_i$ plus these pixels will be the pattern corresponding to a grey level approximately equal to $g_i+(1/N)$.

$P_i$ is then replaced by $P_i$ plus the $n_i$ pixels, and $g_i$ is replaced by $g_i+(1/N)$ in block 226. It is then determined in block 228, whether all pixels in $P_{i+1}$ have been accounted for, or whether an entry has been placed in M at the locations of all the black pixels in $P_{i+1}$. Blocks 218, 220, 222, 224, 226 and 228 are repeated if all the pixels have not been accounted for.

If all the black pixels in $P_{i+1}$ have been accounted for, i is increased by one, in block 230, to begin the next iteration of filling in grey levels between the next pair of grey levels ($g_i$, $g_{i+1}$). In block 232, it is determined whether i is less than k, where k is the total number of patterns. If so, the methodology continues at block 218 with the next pair of patterns. If i is greater than or equal to k, all the grey levels of dither mask M have been accounted for.

Block 234 determines if any undesirable patterns exist in the pattern sequence. An undesirable pattern may have certain user specified characteristics, and may be individually determined by the user. For instance, the user might find purely periodic patterns or purely stochastic patterns undesirable. If it is determined that there is an undesirable pattern in the sequence the methodology continues at block 238. At block 238, two or more patterns are chosen, at least one from each side of the undesirable pattern. The methodology then returns to block 210 to interpolate between the two or more chosen patterns as the initial patterns. Thus, grey levels are formed between the patterns and the undesirable pattern is removed. However, characteristics from the undesirable pattern that were passed on to the two or more chosen patterns may also be passed on to the newly interpolated patterns. If there are no undesirable patterns in block 234, the methodology continues to block 236.

Advantageously, the embodiments of the present invention provide an easy and general way to force certain properties of the patterns of the initial sequence into the final dither mask without having to explicitly design the mask generation apparatus for these cases. For example, if clustering is desired, the patterns of the initial sequence are clustered and interpolation as described here would produce a clustered dither mask. If it is desired to generate a stochastic looking mask, but one that contains a dominant fundamental frequency, a dispersed pattern or patterns at this frequency can be used as the starter set. These patterns could be a very regular dispersed set. After interpolation to a full set of patterns, many of the interpolated patterns will appear to be purely stochastic but still retain this dominant frequency characteristic. Then if these patterns are chosen as a subset for a second interpolation, the resulting mask may appear to be a blue noise mask but will still contain a dominant frequency from the starter patterns. Thus, completely different mask characteristics can be achieved using this invention, which otherwise would require specialized algorithms and methods for each case.

Block 236 provides an optional step that can be used to combine the generated h×v mask M with another predefined $h_2×v_2$ mask $M_2$ into a larger $(h×h_2)×(v×v_2)$ mask $M_3$. A very large dither array $M_3$ may be created while the main intensive computations are performed to generate the relatively smaller mask M. This optional step is fully described in TTW1. If this optional step is used, the dither mask $M_3$ will be used (rather than M) to halftone the image in FIG. 1.

Referring now to FIG. 3, a flow diagram illustrates an exemplary iterative pixel arrangement methodology, according to an embodiment of the present invention. This may be considered a detailed description of block 222 in FIG. 2.

In block 310, $n_i$ locations in $Q_i$ that satisfy the chosen constraints (if any) are randomly selected. In the case when the constraint is "no constraint," locations $n_i$ in $Q_i$ are chosen at random, or possibly with some preferred distribution, such as a uniform distribution. In block 312, a potential r is imposed on each of the $n_i$ points and on each of the black pixels in $P_i$. The sum of the potentials, denoted by $P_T$ (total potential) is then calculated for each point in $Q_i$ that satisfies the constraint. The potential r can depend on $g_i$.

In block 314, it is determined if a pixel having the minimum total potential $P_T$ is a pixel with the maximum total potential $P_T$ in the previous iteration. If this is the first iteration or if the pixel having a minimum total potential did not have the maximum total potential in the previous iteration, the methodology jumps directly to block 316. If the pixel having the minimum total potential is a pixel with the maximum total potential in the previous action, the methodology jumps to block 322. In block 316, one of the $n_i$ points with the highest total potential $P_T$ is moved to a point in $Q_i$ satisfying the constraint chosen in 220 with the lowest total potential $P_T$. The iteration count $C_1$ is then incremented in block 318. In block 320 it is determined if the iteration count $C_1$ is larger than some predetermined maximum. If not, the methodology jumps back to block 312 to start another iteration. Otherwise, the methodology continues at block 322.

In block 322, the count $C_2$ is increased. In block 324, it is determined whether the current configuration of the $n_i$ points is better than the previously saved configuration. "Better" may mean that the largest value minus the smallest value of the corresponding $P_T$ over all points in $Q_i$ satisfying the clustering criteria is smaller. If so, the current configuration is saved in block 326. Otherwise the current configuration is not saved. In block 328, it is determined if $C_2$ is smaller than some predetermined maximum and if the saved configuration of the $n_i$ locations forms a satisfactory pattern, according to some preset objective measurement or by visual inspection. If not (i.e., $C_2$ is too big, or if the pattern is not satisfactory), a new random set of $n_i$ locations in $Q_i$ is chosen by jumping to block 310. Otherwise, the saved configuration of the $n_i$ points will be the final configuration to be used in block 222 of FIG. 2.

Those skilled in the art will recognize that the invention can be used to correct any mask producing appropriate and inappropriate grey levels. Also, the invention can easily be used to change the number of distinct grey levels a mask can produce. Thus, the number of grey levels may be extended, or may be decreased by grouping successive grey levels of the extended mask after completion. Furthermore, a calibrated mask may be generated according to the NIP 17 paper by Wu et al.

Figure 4A:
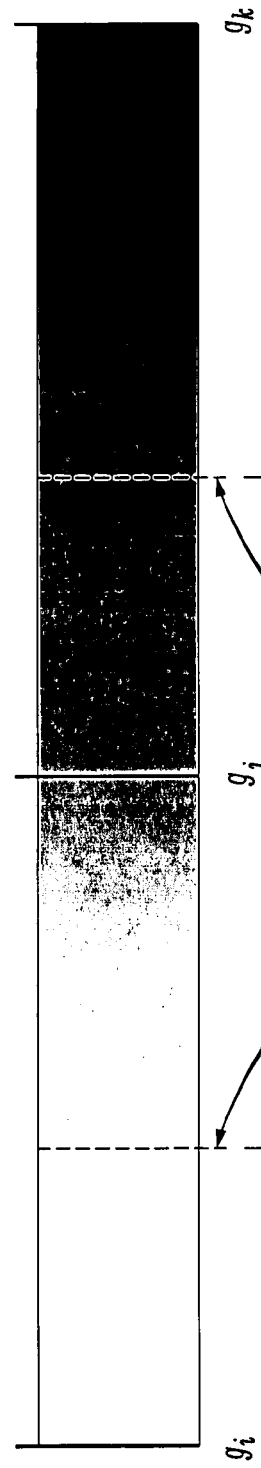
FIG. 4*a* is a diagram illustrating an initial sequence of patterns having interpolated patterns therebetween, according to an embodiment of the present invention.
Figure 4B:
FIG. 4*b* is a diagram illustrating a second interpolation between two selected patterns, according to an embodiment of the preset invention.

Referring now to FIG. 4a, a diagram illustrates a set of patterns and grey levels of a dither mask. The set of original patterns at grey levels $g_i$, $g_j$ and $g_k$ of the initial sequence. Starter grey level $g_j$ has special attributes which are propagated to the interpolated patterns between grey levels $g_i$ and $g_k$. FIG. 4b is a diagram illustrating the grey levels when there is an undesirable pattern as described in blocks 234 and 238 of FIG. 2. More specifically, when grey level $g_j$ corresponds to the undesirable pattern, two interpolated patterns on either side of grey level $g_j$ are chosen and the interpolation methodology is repeated, thereby creating new interpolated patterns between the two selected interpolated patterns. The new patterns also have some characteristics from $g_j$, however, $g_j$ is no longer present.

Figure 5:
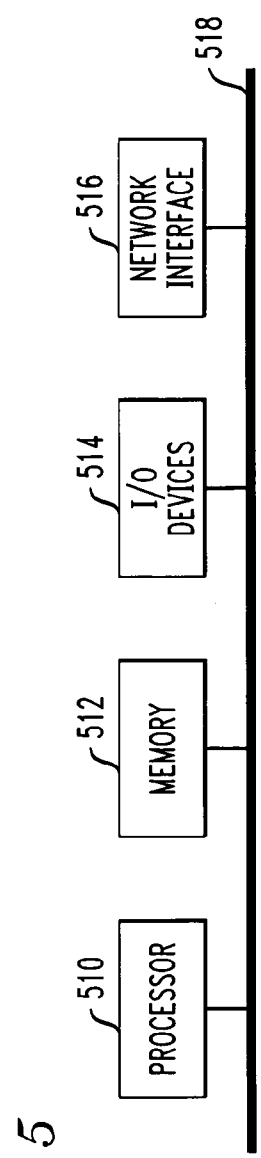
FIG. 5 is a diagram illustrating an illustrative hardware implementation of a computing system in accordance with which one or more components/methodologies of the present invention may be implemented, according to an embodiment of the present invention.

Referring now to FIG. 5, a block diagram illustrates an exemplary hardware implementation of a computing system in accordance with which one or more components/methodologies of the invention (e.g., components/methodologies described in the context of FIGS. 1, 2, 3, 4a and 4b) may be implemented, according to an embodiment of the present invention. For instance, such a computing system in FIG. 5 may contain scanner 11, image storage 12, halftone comparator 14 and printer 15 of FIG. 1.

As shown, the computer system may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit. Input image 10 of FIG. 1 may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A method of generating a dither mask, comprising the steps of:
    selecting a sequence of at least three original patterns, each of the at least three original patterns comprising pixels of at least one of a first color and a second color;
    interpolating between at least two patterns to generate interpolated patterns in the sequence between the at least three original patterns;
    determining if a pattern having at least one specified characteristic exists in the sequence; and
    repeating, when a pattern having at least one specified characteristic exists in the sequence, the steps of: (i) interpolating between at least two patterns, wherein the interpolation is between at least one pattern from each side of the pattern having at least one specified characteristic in the sequence; and (ii) determining if a pattern having at least one specified characteristic exists in the sequence.

2. The method of claim 1, further comprising the step of generating a new dither mask that does not include the pattern having at least one specified characteristic.

3. The method of claim 2, wherein in the step of generating a new dither mask, interpolated patterns of the new dither mask comprise at least one characteristic of the pattern having at least one specified characteristic.

4. The method of claim 1, wherein the step of interpolating between at least two patterns comprises: defining a set of pixels Item a pair of the at least two patterns that are a first color in a first pattern and are not a first color in a second pattern; entering an integer relating to a grey level in the dither mask at locations corresponding to the set of pixels; and repeating the steps of defining a set of pixels and entering an integer for a second pair of patterns when at least one additional pattern exists in the sequence of at least two patterns, wherein the second pattern becomes a new first pattern and additional pattern becomes a new second pattern.

5. The method of claim 4, further comprising the step of repeating until an entry is placed in the dither mask for all locations corresponding to first color pixels in the second pattern.

6. The method of claim 4, wherein in the step of interpolating between at least two patterns, the first pattern in the sequence of at least two patterns comprises all pixels of a second color and the last pattern in the sequence of at least two patterns comprises all pixels of a first color.

7. The method of claim 4, further comprising the step of defining a corresponding grey level for each pattern.

8. The method of claim 7, wherein in the step of defining a corresponding grey level for each pattern, the grey level of the first pattern of the sequence of at least two patterns is 0 and the grey level of a last pattern of the sequence of at least two patterns is 1.

9. The method of claim 4, further comprising the step of choosing one or more constraints for at least one pair of patterns.

10. The method of claim 9, further comprising the steps of redefining the first pattern as the first pattern with the rearranged pixels, and adjusting a grey level of the first pattern.

11. The method of claim 9, further comprising the step of rearranging the set of pixels to satisfy the chosen constraint.

12. The method of claim 11, wherein in the step of rearranging the set of pixels, the rearranged pixels remain within the set, and form an substantially aperiodic pattern.

13. The method of claim 11, wherein the step of rearranging the pixels comprises calculating and evaluating total potential of the pixels and the set 14. The method of claim 13, further comprising the step of iteratively moving a pixel with a substantially highest total potential to a pixel in the set with a substantially lowest total potential that satisfies the constraint until a pixel having a substantially lowest total potential is a pixel with the substantially highest total potential in the previous iteration.

15. The method of claim 13, fiutber comprising the step of determining if a rearranged configuration of pixels is better than a previous configuration.

16. The method of claim 9, wherein in the step of choosing one or more constraints, a constraint comprises clustering criteria.

17. The method of claim 4, wherein in the step of entering an integer, the integer relates to the number of grey levels and the grey level of the first pattern.

18. The method of claim 4, wherein in the step of entering an integer, filling the mask with integers generates halftones for the grey levels for each pair of patterns.

19. The method of claim 4, wherein in the step of interpolating between at least two patterns, each pair of patterns are consecutive in the sequence of at least two patterns.

20. A method of halfioning an image, comprising the steps of:
- generating a dither mask comprising the steps of:
    - selecting a sequence of at least three original patterns, each of the at least three original patterns comprising pixels of at least one of a first color and a second color;
    - interpolating between at least two patterns to generate interpolated patterns in the sequence between the at least three original patterns;
    - determining if a pattern having at least one specified characteristic exists in the sequence; and
    - repeating, when a pattern having at least one specified characteristic exists in the sequence, the steps of: (i) interpolating between at least two patterns, wherein the interpolation is between at least one pattern from each side of the pattern having at least one specified characteristic in the sequence; and (ii) determining if a pattern having at least one specified characteristic in the sequence;
- comparing one or more pixels of the image to the dither mask; and
- printing a dot for one or more of the pixels based on the comparison to the dither mask.

21. The method of claim 20, further comprising the step of scanning an image into image storage.

22. The method of claim 20, further comprising the step of combining the dither mask with a second dither mask in order to form a larger dither mask.

23. Apparatus for generating a dither mask, comprising:
- a memory; and
- at least one processor coupled to the memory and operative to: (i) select a sequence of at least three original patterns, each of the at least three original patterns comprising pixels of at least one of a first color and a second color, (ii) interpolate between at least two patterns to generate interpolated patterns in the sequence between the at least three original patterns; (iii) determine if a pattern having at least one specified characteristic exists in the sequence; and (iv) repeat, when a pattern having at least one specified characteristic exists in the sequence, the operations of: (a) interpolating between at least two patterns, wherein the interpolation is between at least one pattern from each side of the pattern having at least one specified characteristic in the sequence; and (b) determining if a pattern having at least one specified characteristic exists in the sequence.

24. The apparatus of claim 23, wherein the operation of interpolating between at least two patterns comprises: defining a set of pixels from a pair of the at least two patterns that are a first color in a first pattern and are not a first color in a second pattern; entering an integer relating to a grey level in the dither mask at locations corresponding to the set of pixels; and repeating the steps of defining a set of pixels and entering an integer for a second pair of patterns when at least one additional pattern exists in the sequence of at least two patterns, wherein the second pattern becomes a new first pattern and additional pattern becomes a new second pattern.

25. The apparatus of claim 24, wherein the processor is further operative to choose one or more constraints for at least one pair of patterns.

26. The apparatus of claim 25, wherein the processor is further operative to rearrange the set of pixels to satisfy the chosen constraint.

27. The apparatus of claim 26, wherein the operation of rearranging the pixels comprises calculating and evaluating total potential of the pixels and the set.

28. The apparatus of claim 27, wherein the processor is further operative to iteratively move a pixel with a substantially highest total potential to a pixel in the set with a substantially lowest total potential that satisfies the constraint until a pixel having a substantially lowest total potential is a pixel with the substantially highest total potential in the previous iteration.

29. The apparatus of claim 27, wherein the processor is further operative to determine if a rearranged configuration of pixels is better than a previous configuration.

30. A computer-readable medium having associated data, wherein the data, when accessed, results in a processor performing operations comprising:
- selecting a sequence of at least three original patterns, each of the at least three original patterns comprising pixels of at least one of a first color and a second color;
- interpolating between at least two patterns to generate interpolated patterns in the sequence between the at least three original patterns;
- determining if a pattern having at least one specified characteristic exists in the sequence; and
- repeating, when a pattern having at least one specified characteristic exists in the sequence, the steps of: (i) interpolating between at least two patterns, wherein the interpolation is between at least one pattern from each side of the pattern having at least one specified characteristic in the sequence; and (ii) determining if a pattern having at least one specified characteristic exists in the sequence.

* * * * *

UNITED STATES PATENT AND TRADEMARK OFFICE
CERTIFICATE OF CORRECTION

| | |
|---|---|
| PATENT NO. | : 7,446,904 B2 |
| APPLICATION NO. | : 10/856470 |
| DATED | : November 4, 2008 |
| INVENTOR(S) | : Stanich et al. |

It is certified that error appears in the above-identified patent and that said Letters Patent is hereby corrected as shown below:

In column 10, at line 5, delete "Item" and insert --from--.

In column 11, at line 1, delete "halfioning" and insert --halftoning--.

Signed and Sealed this

Twenty-fourth Day of March, 2009

JOHN DOLL
*Acting Director of the United States Patent and Trademark Office*